United States Patent
Ronay

(10) Patent No.: US 12,358,260 B2
(45) Date of Patent: *Jul. 15, 2025

(54) FUNCTIONAL MATERIALS BETWEEN DEFORMABLE BONDED LAYERS

(71) Applicant: Liquid Wire Inc., Portland, OR (US)

(72) Inventor: Mark Ronay, Portland, OR (US)

(73) Assignee: Liquid Wire Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/185,560

(22) Filed: Mar. 17, 2023

(65) Prior Publication Data

US 2023/0364884 A1   Nov. 16, 2023

Related U.S. Application Data

(63) Continuation of application No. 16/831,762, filed on Mar. 26, 2020, now Pat. No. 11,607,863.

(60) Provisional application No. 62/824,138, filed on Mar. 26, 2019.

(51) Int. Cl.
    *B32B 5/26*     (2006.01)
    *B32B 5/02*     (2006.01)
    *B32B 7/12*     (2006.01)

(52) U.S. Cl.
    CPC ............... *B32B 5/26* (2013.01); *B32B 5/022* (2013.01); *B32B 5/024* (2013.01); *B32B 7/12* (2013.01); *B32B 2307/202* (2013.01)

(58) Field of Classification Search
    CPC ........... B32B 5/022; B32B 5/024; B32B 5/26; B32B 7/12; B32B 2307/202
    See application file for complete search history.

(56) References Cited

U.S. PATENT DOCUMENTS

| 11,607,863 | B1 | 3/2023 | Ronay |
| 2002/0034913 | A1* | 3/2002 | Curro .................. A61F 13/512 |
| | | | 428/103 |

OTHER PUBLICATIONS

"U.S. Appl. No. 16/831,762, Advisory Action mailed Jan. 19, 2022", 5 pgs.
"U.S. Appl. No. 16/831,762, Final Office Action mailed Oct. 15, 2021", 17 pgs.

(Continued)

*Primary Examiner* — Christopher M Polley
*Assistant Examiner* — Sathavaram I Reddy
(74) *Attorney, Agent, or Firm* — Quinn IP Law

(57) ABSTRACT

A deformable assembly may include a first structural layer, a first bonding layer bonded to the structural layer, and a pattern of functional material entrapped between the first structural layer and first the bonding layer. The functional material has a viscous characteristic, an elastic characteristic and/or a viscoelastic characteristic. The assembly may further include a second structural layer bonded to the first bonding layer. The first structural layer may include a first piece of fabric, the second structural layer may include a second piece of fabric, and the functional material may be electrically conductive. The functional material may include a conductive gel. The assembly may further include a second bonding layer bonded to the first bonding layer and the first structural layer, and the pattern of functional material may be entrapped between the first and second bonding layers.

19 Claims, 2 Drawing Sheets

(56) References Cited

OTHER PUBLICATIONS

"U.S. Appl. No. 16/831,762, Non Final Office Action mailed Mar. 3, 2021", 13 pgs.
"U.S. Appl. No. 16/831,762, Non Final Office Action mailed Mar. 3, 2022", 13 pgs.
"U.S. Appl. No. 16/831,762, Notice of Allowance mailed Nov. 16, 2022", 8 pgs.
"U.S. Appl. No. 16/831,762, Response filed Jun. 29, 2022 to Non Final Office Action mailed Mar. 3, 2022", 8 pgs.
"U.S. Appl. No. 16/831,762, Response filed Jul. 2, 2021 to Non Final Office Action mailed Mar. 3, 2021", 8 pgs.
"U.S. Appl. No. 16/831,762, Response filed Nov. 30, 2020 to Non Final Office Action mailed Mar. 3, 2021", 1 pg.
"U.S. Appl. No. 16/831,762, Response filed Dec. 15, 2021 to Final Office Action mailed Oct. 15, 2021", 8 pgs.
"U.S. Appl. No. 16/831,762, Restriction Requirement mailed Sep. 28, 2020", 7 pgs.

* cited by examiner

FUNCTIONAL MATERIALS BETWEEN DEFORMABLE BONDED LAYERS

CROSS-REFERENCE TO RELATED APPLICATION

This application claims priority from U.S. Provisional Patent Application Ser. No. 62/824,138 filed Mar. 26, 2019 which is incorporated by reference.

SUMMARY

A deformable assembly may include a first structural layer, a first bonding layer bonded to the structural layer, and a pattern of functional material entrapped between the first structural layer and the first bonding layer. The functional material may have a viscous characteristic. The functional material may have an elastic characteristic. The functional material may have a viscoelastic characteristic. The functional material may have a first storage modulus, the first bonding layer may have a second storage modulus, and the first storage modulus may be higher than the second storage modulus. The functional material may have a first storage modulus, the first structural layer may have a second storage modulus, and the first storage modulus may be higher than the second storage modulus.

The assembly may further include a second structural layer bonded to the first bonding layer. The first structural layer may include a first piece of fabric, the second structural layer may include a second piece of fabric, and the functional material may be electrically conductive. The functional material may include a conductive gel. The assembly may further include a second bonding layer bonded to the first bonding layer and the first structural layer, and the pattern of functional material may be entrapped between the first and second bonding layers. The first structural layer may include a first piece of fabric, the second structural layer may include a second piece of fabric, and the functional material may be electrically conductive. The functional material may include a conductive gel. The first structural layer may have an elastic characteristic. The first bonding layer may have a structural characteristic.

A deformable assembly may include a structural layer, a bonding layer bonded to the structural layer, and a pattern of functional material entrapped between the structural layer and the bonding layer, wherein the functional material may include a fluid component. The functional material may further include a solid component. The functional material may include a gel. The gel may be electrically conductive. The bonding layer may have a structural characteristic.

A method of fabricating a deformable assembly may include forming a pattern of functional material on a first structural layer, and bonding a first bonding layer to the first structural layer, thereby entrapping the pattern of functional material between the first structural layer and the first bonding layer, wherein the functional material may have a viscous characteristic. The method may further include bonding a second structural layer to the first bonding layer. The method may further include bonding a second bonding layer to the first structural layer, the first bonding layer may be bonded to the first structural layer through the second bonding layer, and the pattern of functional material may be entrapped between the first bonding layer and the second bonding layer.

BRIEF DESCRIPTION OF THE DRAWINGS

The figures are not necessarily drawn to scale and elements of similar structures or functions may generally be represented by like reference numerals for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings.

DETAILED DESCRIPTION

Some of the inventive principles of this patent disclosure relate to deformable assemblies that may include a pattern of functional material bonded between various combinations of one or more structural layers and one or more bonding layers. In some embodiments, the functional material may have at least one fluid property or component, for example, as a fluid phase material or a fluid component of a gel material, among others. The functional material may have at least one function that is not primarily structural, for example, conducting electricity, light, sound, etc., sensing one or more stimuli such as stress, strain, pressure, temperature, elongation, etc., mass transport (as of the material itself), thermal transport, mechanical linkage such as transmitting force, motion, pressure, vibrations, etc., and/or any other type of function.

The one or more structural layers may include any types of materials, of any level of hardness, that may create an assembly that may deform by flexing, stretching, twisting, etc., and may or may not have an elastic characteristic that may enable it to return to its original length, shape, etc. after being deformed. Examples include woven or nonwoven fabrics of any type, synthetic or natural polymers of any type including rubbers, woods of any type, papers of any type, etc., sheet metals of any type, etc., and may include any combinations or hybrids thereof.

The one or more bonding layers may include any types of materials capable of forming a bond between itself and/or other layers and/or components. In some embodiments, a bonding layer may have no structural function other than bonding other structural components together. In other embodiments, a bonding layer may itself function as a structural component and/or have structural properties. Examples include adhesives that may be set, cured, activated, etc., through chemical, thermal, optical (e.g., UV light), electrical, physical (pressure sensitive, ultrasound) processes, etc., filler materials for welding (e.g., thermal, ultrasound).

In some embodiments, the one or more bonding layers may also perform a sealing function, for example, to constrain and/or protect the pattern of functional material and/or to act as a seal between structural layers.

Figure 1:
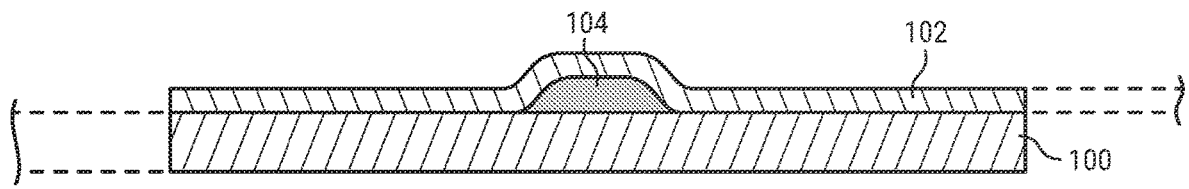
FIG. 1 is a cross-sectional view of an embodiment of a deformable assembly according to this disclosure.

FIG. 1 is a cross-sectional view of an embodiment of a deformable assembly according to this disclosure. The assembly of FIG. 1 may include a structural layer 100, a bonding layer 102 bonded to the structural layer 100, and a pattern of functional material 104 having a viscous characteristic entrapped between the structural layer 100 and the bonding layer 102. In some embodiments, the functional material 104 have a viscoelastic characteristic. In some embodiments, the functional material 104 may include a fluid material and/or a material having both a fluid component and a solid component, for example, a gel.

In some embodiments, one or both of the structural layer 100 and bonding layer 102 may extend as shown by the broken lines such that the assembly may function as a seam or joint between the layers.

Figure 2:
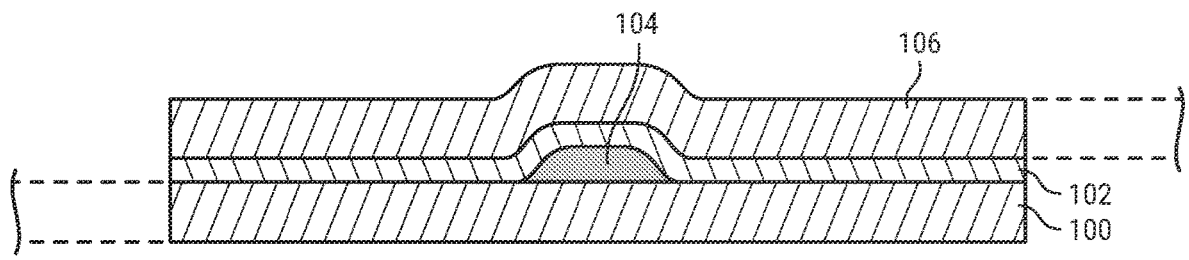
FIG. 2 is a cross-sectional view of an embodiment of a deformable assembly according to this disclosure.

FIG. 2 is a cross-sectional view of another embodiment of a deformable assembly according to this disclosure. As with the assembly of FIG. 1, the assembly of FIG. 2 may include a first structural layer 100, a bonding layer 102 bonded to the first structural layer 100, and a pattern of functional material 104 having a viscous characteristic entrapped between the structural layer 100 and the bonding layer 102. However, the assembly of FIG. 2 may also include a second structural layer 106 bonded to the bonding layer 102. Thus, the second structural layer 106 may be bonded to the first structural layer 100 through the bonding layer 102. In this embodiment, the sole or primary structural function of the bonding layer 102 may be to bond the first and second structural layers 100 and 106. The bonding layer 102 may also perform a sealing function, for example, to constrain and/or protect the pattern of functional material and/or to act as a seal between the structural layers.

In some embodiments, one or both of the structural layers 100 and 106 may extend as shown by the broken lines such that the assembly may function as a seam or joint between the structural layers. In some embodiments, the bonding layer 102 may extend along either or both of the structural layers 100 and 106 as well.

Figure 3:
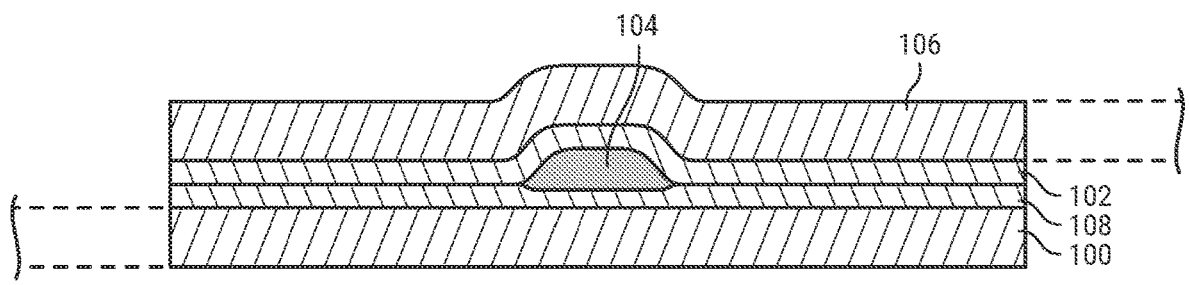
FIG. 3 is a cross-sectional view of an embodiment of a deformable assembly according to this disclosure.

FIG. 3 is a cross-sectional view of another embodiment of a deformable assembly according to this disclosure. As with the assembly of FIG. 2, the assembly of FIG. 3 may include first and second structural layers 100 and 106, a bonding layer 102 bonded to the second structural layer 106, and a pattern of functional material 104 having a viscous characteristic. However, the assembly of FIG. 3 may also include a second bonding layer 108 disposed between the first structural layer 100 and the first bonding layer 102 such that the pattern of functional material 104 is entrapped between the first and second bonding layers 102 and 108. In this embodiment, the sole or primary structural function of either of the bonding layers 102 and/or 108 may be to bond the first and second structural layers 100 and 106 together. The bonding layers 102 and/or 108 may also perform a sealing function, for example, to constrain and/or protect the pattern of functional material and/or to act as a seal between the structural layers.

In some embodiments, one or both of the structural layers 100 and 106 may extend as shown by the broken lines such that the assembly may function as a seam or joint between the structural layers. In some embodiments, either or both of the bonding layers 102 and 108 may extend along either or both of the structural layers 100 and 106 as well.

In the embodiments of FIGS. 1 and 2, the functional material 104 has a cross-sectional shape having corners that may be caused by wetting to the structural layer 100, but in other embodiments the functional material 104 may have any other cross-sectional shape. Likewise, in the embodiment of FIG. 3, the pattern of functional material 104 is shown compressed into the second bonding layer 108, but in other embodiments, the second bonding layer 108 may remain uncompressed.

The example cross-sectional shapes of the components and assemblies illustrated in FIGS. 1-3 are shown for purposes of illustrating the inventive principles. The components and assemblies in other embodiments and implementations may take on a wide range of shapes depending on the characteristics of the materials used including the relative hardness/softness of the materials, as well as the types of bonding processes used including the application of pressure, heat, etc.

Some example embodiments including some example implementation details in the context of some example applications are described below. These examples are provided for purposes of illustrating the inventive principles of this disclosure, but the inventive principles are not limited to these examples.

Fabric bonding using, for example, thermal transfer adhesive tapes such as thermoplastic polyurethane (TPU) with a polyurethane thermal adhesive coat, or thermoset cure in place adhesives such as silicone, may be used to form a bond line between pieces of fabric in apparel manufacture. Such bonding technologies may have advantages such as providing rapid assembly without the use of sewing machines while producing low profile and/or stretchable seams that may improve the comfort and/or performance of a garment or other soft good.

Many efforts have been made to create electrically functional textile articles, such as articles of apparel that include electronic circuit elements such as optical sensors, capacitive sensors, etc., or output devices such as LEDs. However, integrating electronic functionality into textile articles presents challenges. If conductors such as copper wire are used in areas of the textile article that are subject to bending or stretching, they may break in response to the stresses, and they may feel stiff and uncomfortable. The traditional way for such conductors to accommodate stretching of the textile is to place them in serpentine patterns, but that makes the overall textile thick and stiff.

Conventional conductors cannot be placed in bond lines as described above. Bond lines are frequently used in locations where the textile should stretch, and conventional conductors cannot stretch and may weaken or break if subjected to repeated flexing. Conventional conductors embedded in bond lines cannot be replaced or repaired without destruction of the article of apparel. Conventional conductors such as wires may damage the bond line. Ink based printed conductors that require a curing step likewise cannot be placed in bond lines as the bonding agent will not allow volatiles to outgas during the cure step or may chemically interfere with the curing process. Even if a chemical process allows both curing of the printed functional ink trace and the bonding agent, mechanical mismatches between their material properties can cause damage to the bond over time. Accordingly, for these and other reasons, electrically conductive materials adhered to textiles are not conventionally embedded in bond lines.

The inventors have discovered and disclose herein that flexible, stretchable conductors can be bonded in place in a bond line if they remain fluid and have no cure step so as to create an electrically functional textile article that may be flexible, stretchable, and/or durable.

According to some of the inventive principles of this patent disclosure, a stretchable conductor may be printed in place into such a bond line at the time of manufacture. For example, a stretchable wire may be fabricated in line with apparel seams. The stretchable wire or other functional material may have viscous characteristic, an elastic characteristic, and/or a viscoelastic characteristic.

Figure 4:
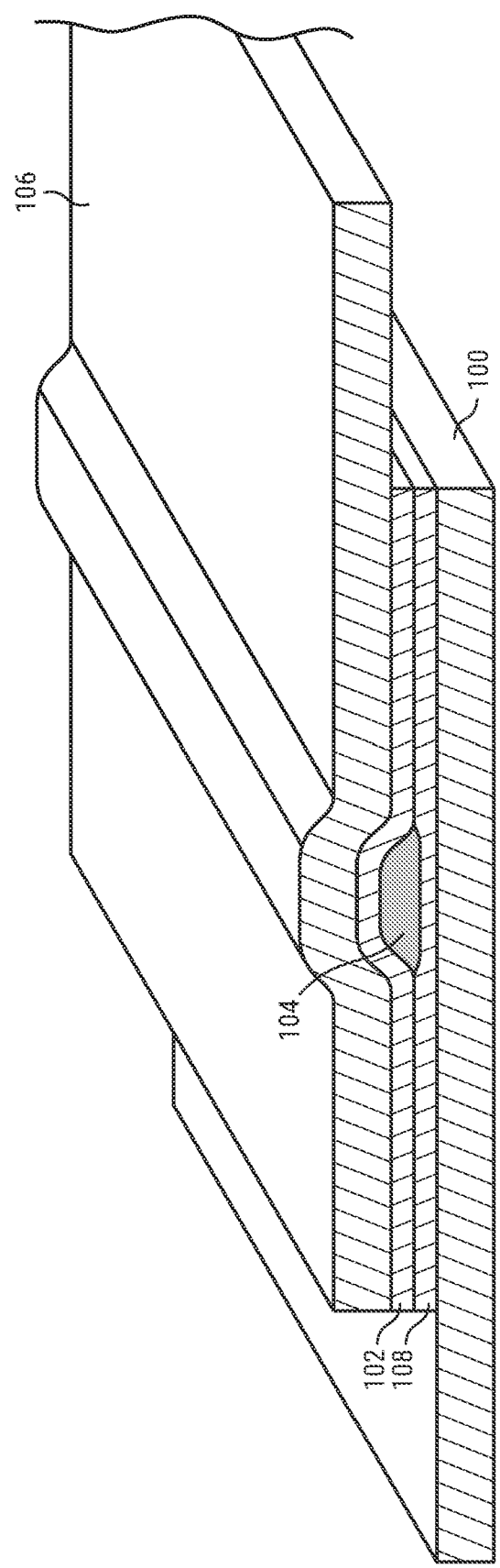
FIG. 4 is perspective view of an embodiment of a deformable assembly according to this disclosure showing a cross-sectional cutaway.

In one example embodiment, a first bonding layer of semi-cured silicone may be attached through, for example, silk screening onto a first piece of fabric which may function as a first structural layer. A fluid phase conductor such as a eutectic or other alloy of Gallium, for example, Gallium-Indium-Tin, may be formed in a wire pattern onto the semi-cured silicone bonding layer. A second joining piece of fabric, which may function as a second structural layer, may be prepared with another bonding layer of semi-cured silicone adhesive. The two bonding layers of silicone may then be brought into contact with each other, thereby bonding the two pieces of fabric together with the wire pattern of fluid conductor entrapped between the two layers of adhesive as shown for example, in FIG. 4. The silicone may be cured chemically and/or thermally and/or with any other suitable curing process, with or without application of pressure to the assembly.

The wire pattern of fluid phase conductor may be formed using any suitable deposition process such as contact printing, jet printing, stenciling, etc. In addition to wire patterns, any other patterns may be used including dots, spirals, meshes, etc. In some embodiments, the conductor may be patterned to form electric components such as capacitors, inductors, antennas, etc.

The wire or other patterns may be used for any function such as transmitting power and/or signals, sensing various stimuli and/or any of the other functions mentioned above.

In some embodiments, the fluid phase conductor may be implemented as a pure or essentially pure fluid which may be characterized, for example, in terms of a viscosity. In other embodiments, the fluid phase conductor may include a solid component, for example, by addition of one or more gelling agents. In such embodiments, the fluid/solid combination may be characterized, for example, in terms of viscoelasticity.

In some embodiments, only one bonding layer may be used. In other embodiments, both of the bonding layers may be omitted and the structural layers of fabric may be bonded directly through any other suitable technique such as thermal or ultrasonic welding.

In another example embodiment, a first bonding layer of TPU may be bonded to a first piece of fabric which may function as a first structural layer. A fluid phase conductor such as Gallium-Indium-Tin may be formed in a wire pattern onto the first bonding layer of TPU as described above. A second facing piece of fabric, which may function as a second structural layer, may have a second bonding layer of, for example, thermal transfer adhesive bonded to a surface of the second piece of fabric. The TPU and thermal transfer adhesive may then be brought into contact with each other, thereby bonding the two pieces of fabric together with the wire pattern of fluid conductor entrapped between the two bonding layers as shown for example, in FIG. 4. The bond may be cured chemically and/or thermally and/or with any other suitable curing process, with or without application of pressure to the assembly. Thus, the two pieces of fabric may be bonded together with a compliant wire entrapped in the bond line.

Any of the above examples may result in a conductive line entrapped in a bond line that may have the inherent advantage of being closed off from external environmental factors and so be protected against such things as washing, rain, mud, dirt and/or other potential sources of damage to the conductive line.

In some embodiments, the functional material may be implemented with a viscoelastic material having both a fluid and a solid component. Such a material may perform, for example, an electroactive function such as conducting electricity, or it may function as a mechanical interconnect, an actuating interconnect, a fuel line or fluid reservoir or any other function. The viscoelastic material may be arranged in any suitable geometry to accommodate any intended function.

In another example embodiment, such a viscoelastic functional material may be formed into a pattern on a second viscoelastic material that may function as a first bonding layer that may be bonded to a first structural layer. The second viscoelastic material may be implemented, for example, as a curable viscoelastic material with solid and fluid components that may become an elastomeric solid upon curing through any suitable method. Alternatively, the viscoelastic material in the bonding layer may be implemented with a surface which may be chemically altered and/or heated to become a viscoelastic material during a bonding process. Any of these curable fluids may be deposited onto a fabric or other structural material layer in preparation for building a laminated composite. The rheological parameters of the viscoelastic functional material and the bonding materials may be chosen so the pattern of functional material may survive a compression cycle prior to the curing of the bonding layer. This may also allow a viscoelastic fluid, gel, paste viscoelastic solid or other non-reversibly deformable material to be entrapped in place during a bonding process.

In rheology $G^*$ may refer to a complex shear modulus which may contain two components: $G'$ and $G''$ which may be referred to as a storage modulus and loss modulus respectively. The storage modulus may essentially characterize an elastic component of a material, whereas the loss modulus may characterize a viscous or liquid component of the material. In some embodiments, by selecting the function material to have a higher $G'$ than the bonding layer and/or structural layer, the pattern of functional material may survive some degree of compression in the bond material during a bonding step. In some embodiments, and depending on the implementation details, a storage modulus of a functional material may be considered "higher" than a storage modulus of a bonding layer and/or structural layer if it is higher by an amount that may enable the functional material to withstand compression during bonding while still remaining functional after bonding.

In some embodiments, a functional material having a primarily fluid characteristic may have a solid component imparted into the fluid so that a pattern of the functional material may withstand being entrapped in a bond line on a soft good, rubber good or other article of manufacture by bonding structural materials together using an elastomeric bonding agent such as a polyurethane, silicone, epoxy, acrylic or other adhesive.

In another example embodiment, one or more methanol fuel lines and/or reservoirs may be built in an additive process using the principles disclosed herein with the following steps. (1) A first bonding layer of silicone adhesive may be silkscreened onto a first piece of fabric substrate and partially cured. (2) A methanol fuel may have a solid component imparted thereby by, for example, jellifying the methanol with a gelling agent. (3) The gelled methanol may be patterned onto the partially cured silicon by silk screening, nozzle dispensing, stenciling, or any other suitable method. (4) A second facing piece of fabric (textile) may be prepared with an uncured silkscreened silicone adhesive bonding layer. (5) The two bonding layers may be brought into contact such that the pattern of gelled methanol functional material is sandwiched in place. (6) The silicone bonding layers may then be cured using any suitable curing process. The resulting structure may include a channel or other pattern of gelled methanol entrapped in a bond line thereby forming one or more fuel lines and/or reservoirs.

Although the inventive principles are not limited to any specific compositions for use as the functional material, some examples include, but are not limited to, deformable conductors such as a gallium indium alloys, some examples of which are disclosed in U.S. Patent Application Publication No. 2018/0247727 published on Aug. 30, 2018 which is incorporated by reference. In various examples disclosed in U.S. Patent Application Publication No. 2018/0247727, the functional material is a mixture of eutectic gallium alloy and sub-micron scale gallium oxide particles, the mixture of eutectic gallium alloy and gallium oxide has a weight percentage (wt %) of between about 59.9% and about 99.9% eutectic gallium alloy, and the functional material is stabilized by the gallium oxide particles. In various such examples, the functional material further comprises one or more micro-particles or sub-micron scale particles dispersed within the mixture, where the micro-particles have a wt % of between about 0.001% and about 40.0% of micro-particles in the composition. In various such examples, the functional material has an electrical property having a substantially linear response proportional over a predetermined range when stretched. In various such examples, the functional material exhibits a non-Newtonian behavior. Other suitable electroactive materials may include any compositions featuring conductive metals including gold, nickel, silver, platinum, copper, etc.; semiconductors based on silicon, gallium, germanium, antimony, arsenic, boron, carbon, selenium, sulfur, tellurium, etc., semiconducting compounds including gallium arsenide, indium antimonide, and oxides of many metals; organic semiconductors; and conductive nonmetallic substances such as graphite. Examples of suitable non-electroactive compositions include many other types of fluids and/or gels such as, for example, silica gels, and chafing fuel such as Sterno, etc.

In some embodiments, materials and/or fabrication techniques described in U.S. Patent Application Publication No. 2020/0066628 published on Feb. 27, 2020 which is incorporated by reference may be used in conjunction with any of the methods and/or articles of manufacture described herein, for example, to provide one or more connections to the functional material.

In some embodiments, after bonding, two layers may become a single layer although they may still be referred to as two layers. In some embodiments, one layer may be bonded to another layer directly or through one or more intermediary layers. A functional material may be entrapped directly between two layers or with one or more an intervening layers. A material or layer may be formed on another layer directly, or indirectly with one or more intervening layers or materials. Thus, for example, a functional material may be formed on a structural layer by forming it on a bonding layer which may already or subsequently be bonded to the structural layer. The terms "first", "second", etc., as used herein may be used for convenience of reference, for example, to distinguish between different elements, but the use of "first", "second", etc. thing does not necessarily imply the presence of another such thing.

In some embodiments, a functional material may have at least one function that is not primarily structural, e.g., conducting light and/or electricity, sensing one or more stimuli, mass transport (as of the material itself), thermal transport, mechanical linkage (e.g., transmitting force, pressure, vibrations, etc.). In some embodiments, a functional material may include multiple materials, for example, a mixture, lamination, emulsion, etc. Likewise, a pattern/formation may include multiple patterns/formations.

Since the inventive principles of this patent disclosure can be modified in arrangement and detail without departing from the inventive concepts, such changes and modifications are considered to fall within the scope of the following claims.

The invention claimed is:

1. A deformable assembly comprising:
   a first fabric layer;
   a first bonding layer, bonded to the first fabric layer;
   a second fabric layer;
   a second bonding layer, bonded to the second fabric layer; and
   a fluid-phase conductor entrapped between the first bonding layer and the second bonding layer to seal or constrain the fluid-phase conductor between the first and second bonding layers;
   wherein the fluid-phase conductor comprises a metal; and
   wherein the first bonding layer is bonded to the second bonding layer and the first and second bonding layers bond the first fabric layer to the second fabric layer.

2. The deformable assembly of claim 1, further comprising a first piece of fabric and a second facing piece of fabric, wherein the first piece of fabric includes the first fabric layer and the second facing piece of fabric includes the second fabric layer.

3. The deformable assembly of claim 1, further comprising:
   a first piece of fabric including the first fabric layer; and
   a second piece of fabric including the second fabric layer.

4. The deformable assembly of claim 1 wherein the fluid-phase conductor has a viscoelastic characteristic.

5. The deformable assembly of claim 4 wherein the fluid-phase conductor has a storage modulus higher than a storage modulus of the first bonding layer.

6. The deformable assembly of claim 5, wherein the storage modulus of at least one of the first and second bonding layers is greater than a storage modulus of the first fabric layer.

7. The deformable assembly of claim 1, wherein the fluid-phase conductor comprises a conductive gel.

8. The deformable assembly of claim 1, wherein the first bonding layer is a bond line and wherein the fluid-phase conductor extends along the bond line.

9. The deformable assembly of claim 8, wherein the fluid-phase conductor is configured to deform along the bond line.

10. The deformable assembly of claim 9, further comprising a gelled methanol entrapped in the bond line.

11. The deformable assembly of claim 10, wherein the gelled methanol forms a fluid line along the bond line.

12. The deformable assembly of claim 9, wherein the bond line isolates the fluid-phase conductor from an environmental condition.

13. The deformable assembly of claim 1, wherein the fluid-phase conductor forms a functional pattern.

14. The deformable assembly of claim 13, wherein the fluid-phase conductor is patterned to form an electrical component including at least one of a capacitor, an inductor, or an antenna.

15. The deformable assembly of claim 1, wherein the first bonding layer is formed of thermoplastic polyurethane (TPU).

16. The deformable assembly of claim 1, wherein the metal is a mixture of eutectic gallium alloy and sub-micron scale gallium oxide particles; wherein the mixture of eutectic gallium alloy and gallium oxide has a weight percentage (wt %) of between about 59.9% and about 99.9% eutectic gallium alloy; and wherein the metal is a gel that is stabilized by the sub-micron scale gallium oxide particles.

17. The deformable assembly of claim 16, wherein the metal further comprises one or more micro-particles or sub-micron scale particles dispersed within the mixture, where the micro-particles have a wt % of between about 0.001% and about 40.0% of micro-particles in the composition.

18. The deformable assembly of claim 1, wherein the fluid-phase conductor has an electrical property that changes in a manner that is linear and a predictable function of deformation when stretched.

19. The deformable assembly of claim 1, wherein the fluid-phase conductor exhibits a non-Newtonian behavior.

\* \* \* \* \*